(12) United States Patent
Haase et al.

(10) Patent No.: US 7,447,860 B1
(45) Date of Patent: *Nov. 4, 2008

(54) SYSTEM AND METHOD FOR MANAGING DATA ASSOCIATED WITH COPYING AND RECOVERY PROCEDURES IN A DATA STORAGE ENVIRONMENT

(75) Inventors: David Haase, Fuquay Varina, NC (US); Somnath Gulve, Morrisville, NC (US); Michael D. Haynes, Raleigh, NC (US); Dennis Duprey, Raleigh, NC (US)

(73) Assignee: EMC Corporation, Hopkinton, MA (US)

( * ) Notice: Subject to any disclaimer, the term of this patent is extended or adjusted under 35 U.S.C. 154(b) by 113 days.

This patent is subject to a terminal disclaimer.

(21) Appl. No.: 10/673,664

(22) Filed: Sep. 29, 2003

(51) Int. Cl.
*G06F 12/00* (2006.01)

(52) U.S. Cl. .................................... 711/164; 707/204
(58) Field of Classification Search ................ 711/103, 711/112, 114–115, 161–162
See application file for complete search history.

(56) References Cited

U.S. PATENT DOCUMENTS

| 5,592,618 A * | 1/1997 | Micka et al. .................. 714/54 |
| 6,898,681 B2 * | 5/2005 | Young ........................ 711/162 |
| 2003/0115432 A1 * | 6/2003 | Biessener et al. ........... 711/162 |
| 2003/0177322 A1 * | 9/2003 | Crockett et al. ............. 711/161 |
| 2004/0260873 A1 * | 12/2004 | Watanabe .................... 711/114 |

* cited by examiner

*Primary Examiner*—Kevin Ellis
*Assistant Examiner*—Hashem Farrokh
(74) *Attorney, Agent, or Firm*—Krishnendu Gupta; R. Kevin Perkins; Joseph D'Angelo

(57) ABSTRACT

This invention is a system and method related to restoring data in a data storage environment and includes program logic.

12 Claims, 8 Drawing Sheets

SYSTEM AND METHOD FOR MANAGING DATA ASSOCIATED WITH COPYING AND RECOVERY PROCEDURES IN A DATA STORAGE ENVIRONMENT

RELATED APPLICATION

This application is related to U.S. patent application Ser. No. 10/679,726 filed on Oct. 6, 2003 and entitled; "System and Method for Managing Data Associated with Copying and Recovery Procedures in a Data Storage Environment". This application is also related to Ser. No. 10/679,662 filed on Oct. 6, 2003 and also entitled; "System and Method for Managing Data associated with Copying and Recovery Procedures in a Data Storage Environment".

A portion of the disclosure of this patent document contains command formats and other computer language listings, all of which are subject to copyright protection. The copyright owner, EMC Corporation, has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This application generally relates to data storage management, and more particularly to management related to copying or replication of data in a data storage environment

BACKGROUND

Computer systems may include different resources used by one or more host processors. Resources and host processors in a computer system may be interconnected by one or more communication connections. These resources may include, for example, data storage systems, such as the Symmetrix™ or CLARiiON™ family of data storage systems manufactured by EMC Corporation. These data storage systems may be coupled to one or more host processors and provide storage services to each host processor. An example data storage system may include one or more data storage devices, such as those of the Symmetrix™ family, that are connected together and may be used to provide common data storage for one or more host processors in a computer system.

A host processor may perform a variety of data processing tasks and operations using the data storage system. For example, a host processor may perform basic system I/O operations in connection with data requests such as data read and write operations. Host processor systems may store and retrieve data using a storage device containing a plurality of host interface units, disk drives, and disk interface units. Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data stored therein.

It is known that is desirable to copy or replicate data, including for a backup operation. Once data is replicated, copied, or otherwise backed up it may be used for a recovery or restoration process, wherein the copy of the data is restored back onto the source. This may be done for a variety of reasons including failures. So for example, data may be restored from the last good copy. However, the inventors of the present invention discussed below have critically recognized that it would be advantageous to protect such a last good copy itself from being corrupted during a recovery or restoration process.

SUMMARY

To overcome the problems of the prior art mentioned above and to provide advantages also described above, this invention is a system and method for protecting data during a recovery or restoration process.

In one embodiment, the invention is implemented as steps in a process. In other embodiments, implementations include a system, a computer program product, or an apparatus, wherein each embodiment is configured for carrying out the steps involved in the methodology.

BRIEF DESCRIPTION OF THE DRAWING

The above and further advantages of the present invention may be better under stood by referring to the following description taken into conjunction with the accompanying drawings in which.

DETAILED DESCRIPTION OF THE PREFERRED EMBODIMENTS

Introduction

Figure 1:
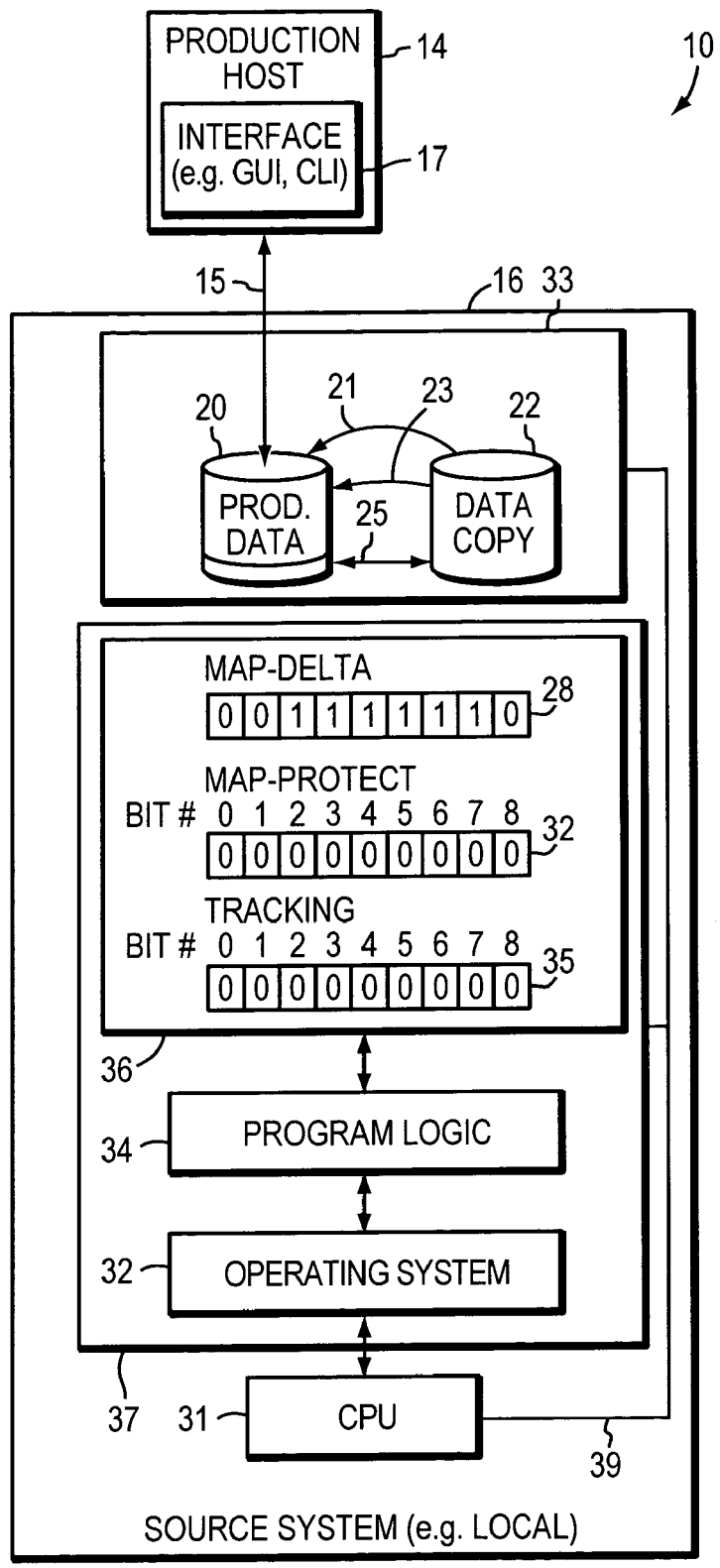
FIG. 1 shows a block diagram schematic of an embodiment of a data storage environment including at least one data storage system and including program logic for carrying out the method embodiments of the present invention.

In the preferred embodiment, the embodiment operates in cooperation and may be a part of computer software, operating the preferred EMC CLARiiON or Symmetrix storage systems available from EMC Corporation of Hopkinton, Mass., although one skilled in the art will recognize that the invention may be used with other data storage systems. In the preferred embodiment, EMC CLARiiON storage system implements aspects of the present invention as part of software that operates with such a storage system. In this preferred embodiment, a locally accessible mirror copy of a specified Logical Unit (LU), or logical mirror copy is available for backups or other host processes. The logical mirror copy may also be useful for operations that change data, such as production testing or data warehousing, without disrupting the production database.

Terminology

Some terminology used herein is shown in here in Table 1:

Source: Typically a logical unit (LU) from where data is mirrored or copied, and which herein is sometimes referred to as being cloned.
Clone: Another LU, other than the Source LU, but which is a copy of the specified Source.
Clone Group: A collection of a Source and all of its Clones.
Sync Engine: A part of the Program Logic that copies data between a Source and a Clone
Synchronization: Process of updating the data contents of Clone with that of its Source, preferably performed by the Sync Engine
Reverse Synchronization (Reverse Sync) Process of updating the data contents of a Source from one of its Clones, preferably is performed by the Sync Engine
Extent: An extent is a number of contiguous data blocks on an LU that is represented by a specific amount of data, e.g. a bit in a map, e.g. a bitmap
Copy On Demand (COD): Process of copying a specific extent from the Clone to the Source, as occasionally required during a Protected Restore
COD Engine: A part of the Program Logic that coordinates and performs all COD.
Fracture: Process of logically disconnecting or discontinuing mirroring of data from the Source to a Clone (also known as splitting-off a Clone).
Delta Map: A map (e.g. a bitmap) that represents the extents that are different between the Clone and its Source.
COD Queue: This is a component of the Protected Restore that coordinates all the I/O requests that require data copied from the Clone LU to the Source LU before it can be processed.
COD Scoreboard: This is a component of the Protected Restore that allows the COD Engine and Sync Engine to coordinate which segments of the device are currently being copied either by the reverse-sync operation or by a COD operation.
Recovery Process: These are the steps that are performed to resume a Protected Restore that stopped because of a system failure (e.g., a re-boot). These steps are typically performed when the system boots up
Persistent Delta Map: The Delta Map stored on disk that is used for all the Clones in a Clone Group. It is used during a Recovery Process to fill the Delta Maps for all the Clones in a Clone Group.
Protected Restore Map: A map (e.g., a bitmap) used to track the extents of the Source LU that have been modified during a Protected Restore. This map is kept in memory as well as persistently for recovering from failures.

In a preferred embodiment, an important feature is a process denominated as a "Protected Restore". This process involves a reverse-synchronization by copying the data content on the mirror copy back to the Source. But, due to the critical recognition of the inventors, unlike a prior art reverse-synchronization, the content of the mirror copy is protected during a Protected Restore. The ability to perform a Protected Restore is advantageous to a user. The user may logically disconnect or fracture the mirror copy from its Source, it represents a full point-in-time copy of the user's production data. This fractured Clone can then be used to restore the Source with the data from a previous point-in-time (prior to the corruption of the production data). By preserving the content of the Clone during the Protected Restore, future restores using the same Clone result in the same point-in-time copy of data being copied to the Source.

Because of the various actions involved and taken care of during a Protected Restore, various internal mechanisms are included in embodiments of the invention to enable their implementation. These include a (1) Protected Restore map useful for (a) tracking changes during a Protected Restore; and (b) resuming an interrupted Protected Restore; and (2) a Copy-On-Demand (COD) Mechanism useful for processing Host I/O requests in a timely manner.

The preferred EMC embodiment may operate with EMC's TimeFinder and SnapView local replication applications, which eliminate the impact to production activities by using Business Continuance Volumes (BCV's) (discussed in the incorporated '497 patent referenced below) or Snapshots as source volumes so applications stay online throughout the data movement process. However, the present invention may be used without requirement of such BCV's or Snapshots. For the sake of completeness, operational features embodied in EMC's Timefinder and Symmetrix are described in U.S. Pat. No. 6,101,497 issued Aug. 8, 2000, and also in U.S. Pat. No. 5,206,939 issued Apr. 27, 1993, each of which is assigned to EMC the assignee of this invention and each of which is hereby incorporated by reference. Consequently, the following discussion makes only general references to the operation of such systems.

PREFERRED EMBODIMENT DESCRIPTION

Referring to FIG. 1, Data Storage Environment 10 includes a Production Host 14 with an Interface 17, e.g. a graphical user interface a.k.a. GUI or command line interface a.k.a. CLI, or any type of communication link including a network link for communicating with Data Storage System 16 across path 15, and in particular for accessing Production Data 20. Interface 17 may enable communication with the Data Storage system based on user or computer-generated commands.

Figure 3:
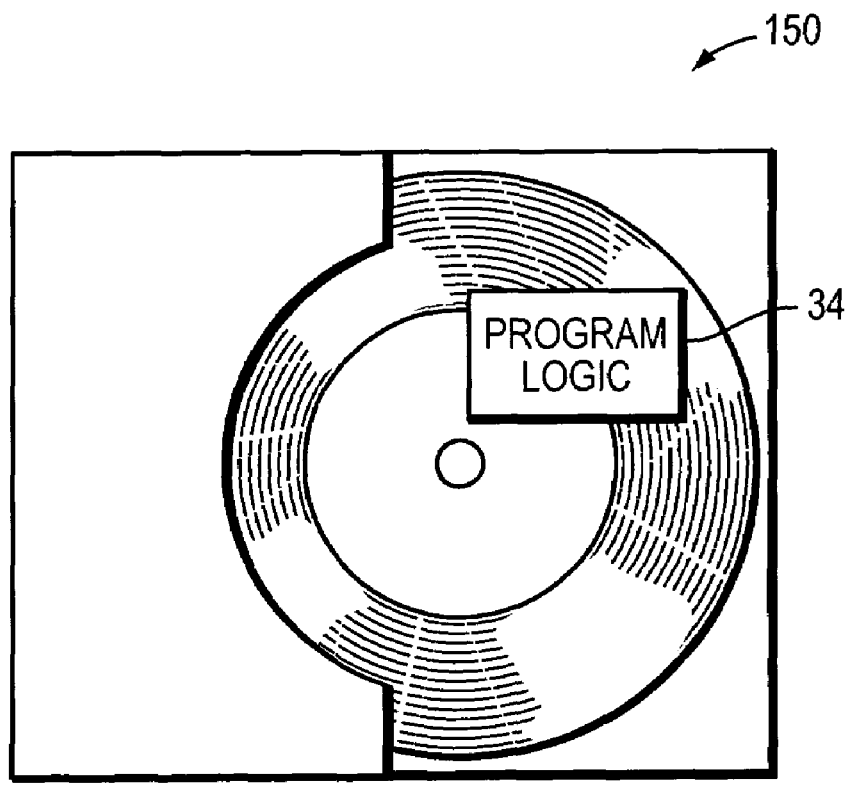
FIG. 3 shows a computer-readable medium including computer-executable code including the program logic for carrying out method steps of the method embodiments of the present invention.

Reference is made now to FIGS. 1 and 3. Generally, in a preferred embodiment the maps in memory are used by the Program Logic 34 in cooperation with the operating system 32, and the CPU 31 on the source data storage system 16. The maps and Program logic operate in electronic memory 37 and when executed by CPU 31 over communication path 39 carry out method steps embodying the invention. It is preferred that the Program Logic be computer software although it is possible for it to be embodied in whole or part in hardware or firmware. Program Logic 34 may also be embodied on a computer-executable medium 150 as shown in FIG. 3, and wherein the Logic is encoded in computer-executable code configured for carrying out steps of a method embodiment of this invention. The methods and apparatus of this invention may take the form, at least partially, of program code (i.e., instructions) embodied in tangible media, such as floppy diskettes, CD-ROMs, hard drives, random access or read only-memory, or any other machine-readable storage medium, such as Medium 150 (FIG. 3) encoded with Program Logic 34. When the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission. It may be implemented such that herein, when the program code is received and loaded into and executed by a machine, such as a computer, the machine becomes an apparatus for practicing the invention. When implemented on one or more general-purpose processors, the program code combines with such a processor to provide a unique apparatus that operates analogously to specific logic circuits.

Figure 2:
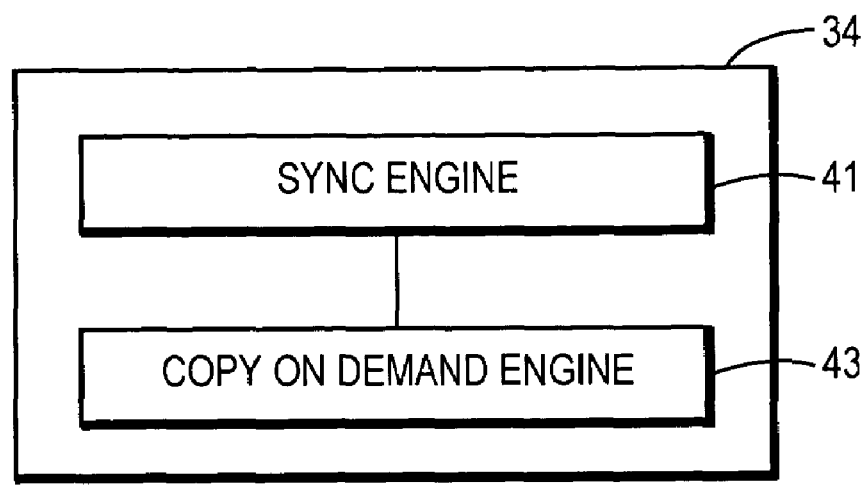
FIG. 2 shows another schematic block diagram including modules of the program logic.

Referring to FIGS. 1 and 2. a Data Storage Environment 10 includes a Production Host 14 with an interface 17 that may be for example a graphical user interface (GUI) or command line interface (CLI). A user, or some form of automated process may invoke processes of the present invention through interface 17 and communication path 15, and such processes may include the Protected Restore feature discussed above. In general, in a preferred embodiment, when a user initiates a Protected Restore, discussed further with reference to FIG. 4 below, the Program Logic 34 which includes the Sync Engine 41 (FIG. 2) begins a reverse-sync along path 21 to copy data from the Data Copy or Clone 22 to the Production Data or Source 20 in memory 33. Although the Clone is shown on the same system as the Production Data, it may be located on another Data Storage System.

Figure 4:
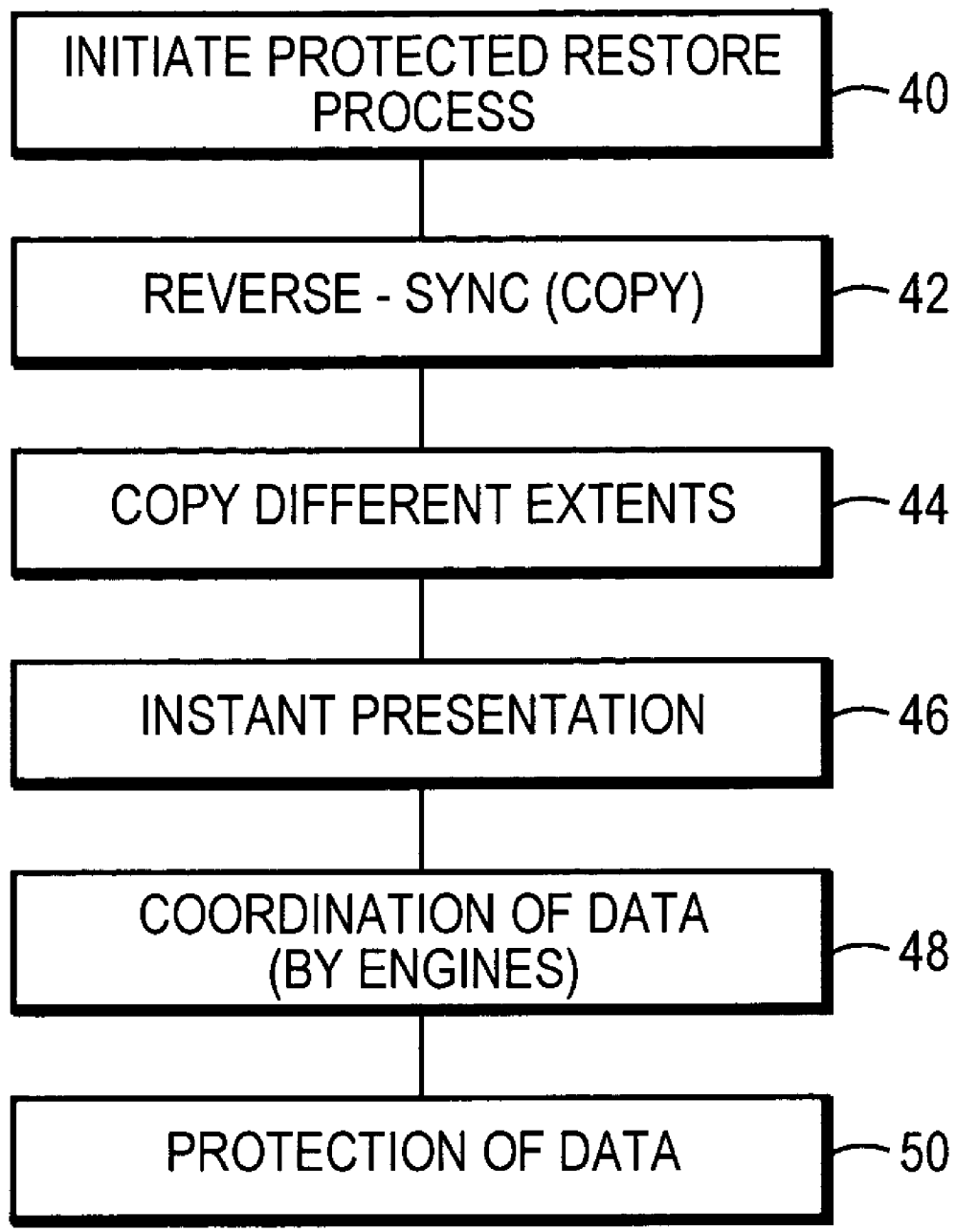
FIG. 4 shows another flow logic diagram of steps for carrying out the method embodiments of the present invention.

Referring to FIG. 4, an overview of a methodology embodying at least some aspects of the invention is shown. In step 40, the Protected Restore Process is initiated. A reverse-sync procedure automatically begins in step 42. Different extents required for such a procedure are copied in step 44. A presentation of the data on the source is presented in an apparent instant fashion in step 46, and the engines (Sync and COD) coordinate in step 48. The data is Protected in step 50 despite the risks involved during the copying. Each of these steps are discussed in more detail herein.

The Sync Engine uses the Delta Map 28 stored in memory 36 to preferably copy only the extents that are different between the Clone and its Source, and a Protected Restore Map 32 and also a Tracking Map 35 are used as described herein. The Sync Engine copies the required data, preferably, starting at the beginning of the Clone and working its way to the end of the LU. However, once the Protected Restore process has been initiated, the user may expect the data from the Clone to "instantly' appear on the Source (even if the Sync Engine has not copied the data yet). This "instant appearance" of data is accomplished via the Copy on Demand or COD Engine 43 of the Program Logic (FIG. 2).

When a host I/O request is received by the Source, the request will be placed in the COD Queue and the COD Engine will copy any required data areas (represented by bits set in the Delta Map 28) from the Clone to the Source in order to allow the host I/O request to be processed. Without the COD Engine copying this data on-demand, host I/O requests could time-out waiting for the Sync Engine to copy it. During the Protected Restore, the Sync Engine and COD Engine work together to coordinate the copying of data from the Clone to the Source. The Sync Engine works sequentially across the Clone LU copying the required data, while the COD Engine copies the required data to ensure the quickest processing of host I/O requests. These two engines use the Tracking Map denominated as a COD Scoreboard 35 to communicate with each other.

Unlike a regular Reverse-Sync, a Protected Restore ensures that the data on the Clone is not modified during the operation. During a regular Reverse-Sync, host write requests received by the Source are simply mirrored to the Clone while host read requests are redirected and processed by the Clone. Both the Protected Restore Map 32 as well as the Delta Map 28 are used during the Protected Restore to protect the Source and Clone from data corruption while presenting an "instant" copy of the Clone's data on the Source. It also ensures the tracking of those data areas that are different between the Source and Clone for subsequent operations.

During a Protected Restore, the Sync Engine copies data from the Clone to its Source. During this reverse-sync, the Sync Engine uses the Clone's Delta Map to determine which extents are required to be copied. If a bit is set in the Delta Map for a particular region, it means that the data in that region is different between the Clone and its Source and must be copied. As extents are copied from the Clone to its Source, their corresponding bits are cleared from the Delta Map.

Because host I/O can continue to the Source during the Protected Restore, data may be written to it during the operation. These changes to the Source must be tracked for subsequent Synchronization or Protected Restore operations. The Protected Restore Map is used to track those extents that are modified due to host write requests during the Protected Restore. Once the Sync Engine completes the reverse-sync, this Protected Restore Map becomes the new Delta Map for the Clone.

When a host-write request is received for the Source LU during a Protected Restore, a determination is made whether a COD is required prior to processing the request. This determination is made by checking both the Delta Map and the Protected Restore Map. If there are bits set in any of the extents of the Delta Map that represent those regions affected by the host I/O request (read or write) and the corresponding bit is NOT set in the Protected Restore Map, then a COD is required. After each required COD has completed, the bit that corresponds to the extent affected by the COD is cleared from the Clone's Delta Map. This is done to ensure that the Sync Engine does not subsequently copy the data from the Clone to the Source which would cause a host write request (which triggered a COD) to later be overwritten with data from the Clone.

After each COD required for a host write request has been completed, the bit(s) that correspond to the extent affected by the request are set in the Protected Restore Map. This is done to track the changes between the Source and Clone.

Figure 5:
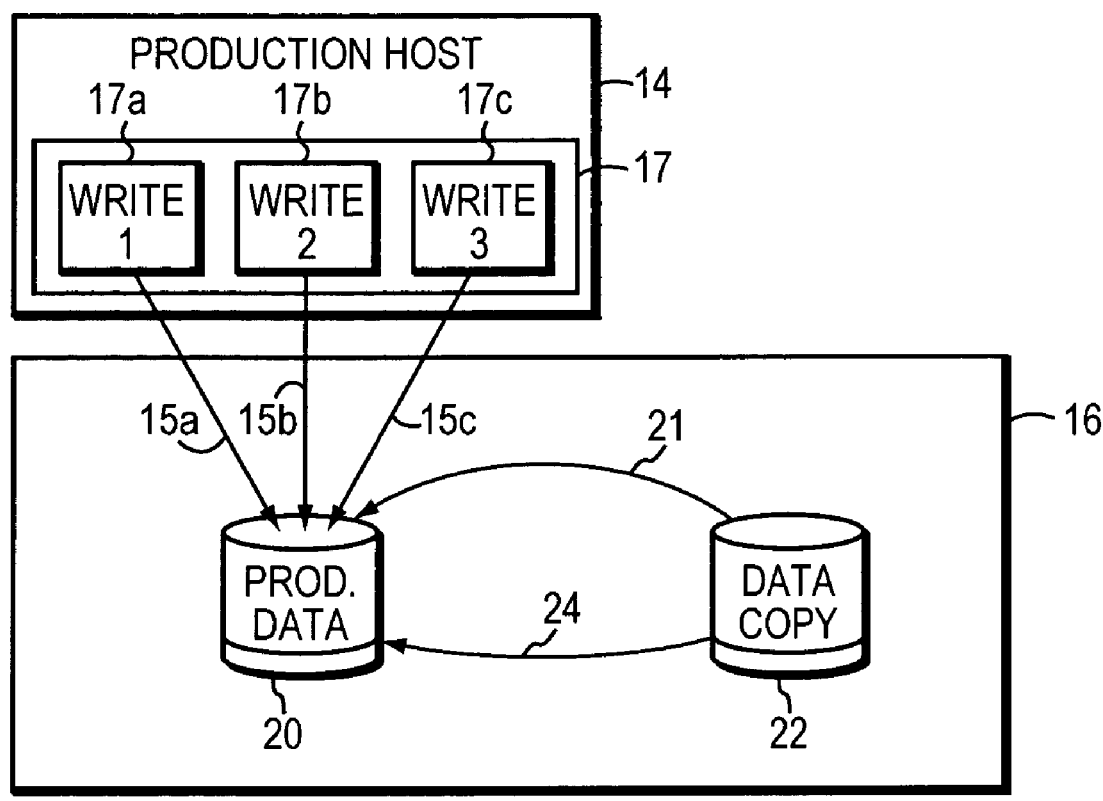
FIG. 5 shows an exemplary embodiment including the data storage system and program logic of FIG. 1.

Referring to FIG. 5, an exemplary embodiment is shown to further describe the operation of the invention. Production Host 14 includes interfaces 17a-17c involved with Host-write 1-3, respectively over communication path 15a-c, respectively to source 20, and wherein Reverse-Sync's are enabled over path 21 for Clone 22, and path 24 may also be used for operations.

Figure 6:
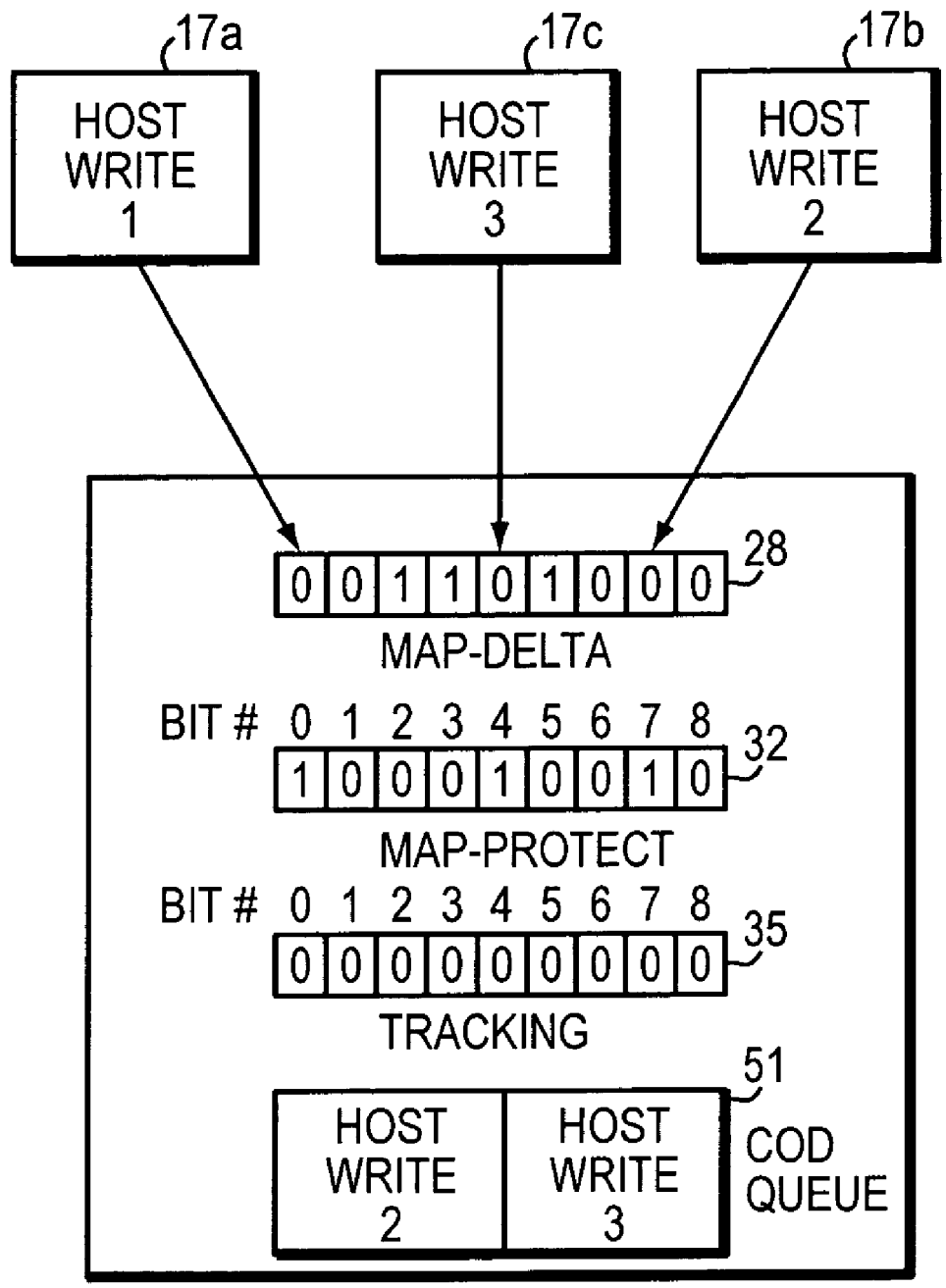
FIG. 6 shows an example of what may be experienced during carrying out the methodology of this invention.

Referring now to FIG. 6, the respective maps 28-35 are shown as they change after the respective Host-write requests over interfaces 17a-c. Write 1 does not require a COD because bit (0) is not set in the Clone's Delta Map 28. Write 1 is processed and bit 0 is set in the Protected Restore Map 32 to indicate that the data has been modified in the extent represented by bit 0. Write 2 and 3 both require CODs because bits 4 and 7 are set in the Clone's Delta Map but not in the Protected Restore Map. Both Write 2 and 3 are put on the COD Queue 51 while a COD is performed on the extents represented by bits 4 and 7 in the Delta Map. After the CODs, bits 4 and 7 are cleared from the Clone's Delta Map. Bits 4 and 7 are then set in the Protected Restore Map and Write 2 and 3 are removed from the COD Queue and are processed.

Figure 7:
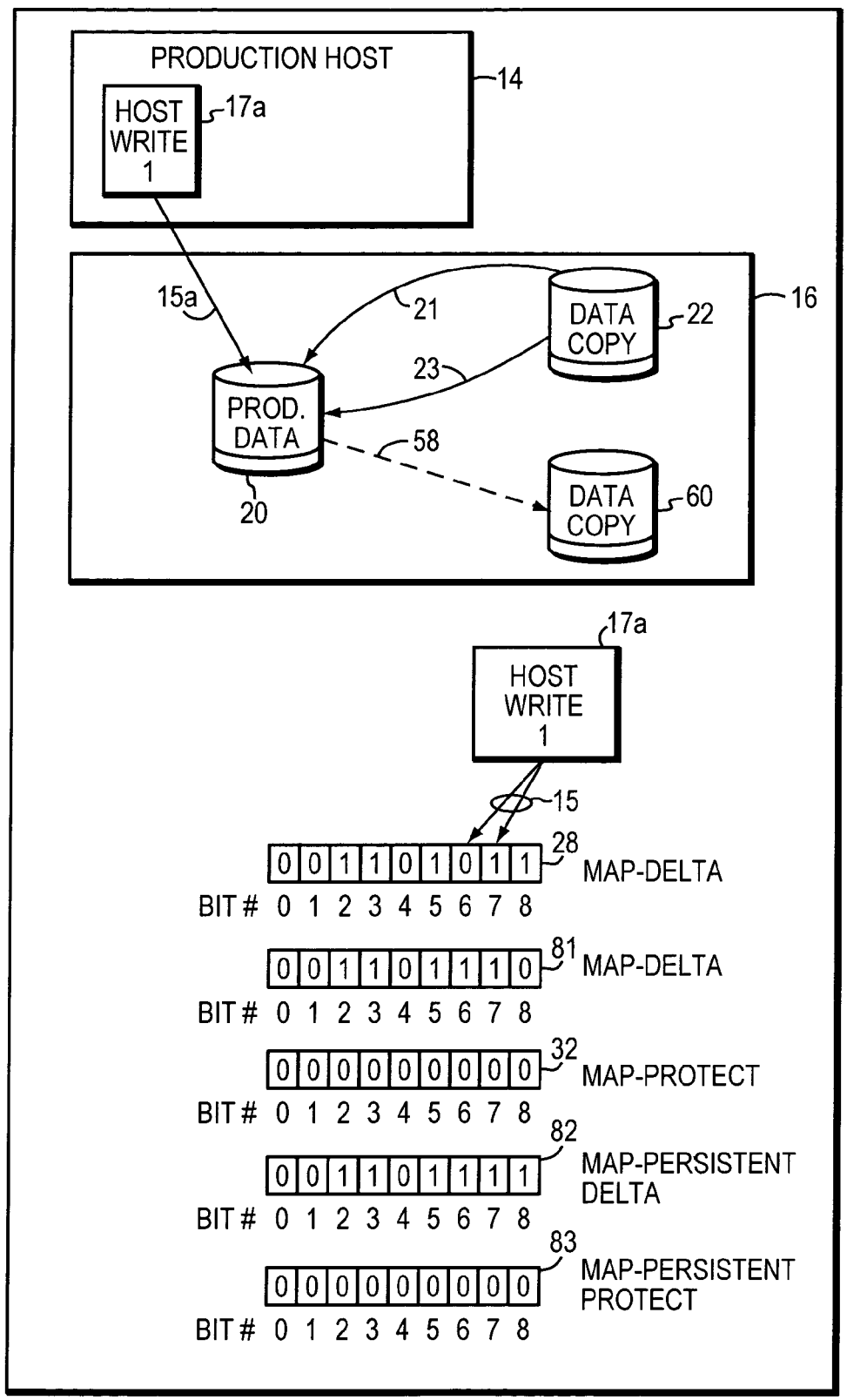
FIG. 7 shows another exemplary embodiment including the data storage system and program logic of FIG. 1 and illustrates an example of states that may be experienced during carrying out the methodology of this invention.

Referring to FIG. 7, an example of embodiments of the invention operating in the case of a failure scenario is described. Delta Maps and the Protected Restore Map are used to protect the Source 20 from data corruption. The following example illustrates the state of a Clone Group (Source 20 and Clones 22 and 60) during a Protected Restore. In this example, the Sync Engine of the Program Logic copies the required data (using the Delta Map 28) from Data Copy or Clone 22 to the Source 20 while Data Copy or Clone 60 is in a fractured state (represented by broken line designation for path 58 from the Source to Clone 60). For the sake of completeness, Reverse-Sync operations from Clone 22 to Source 20 occur over path 21, and COD's occur over path 23 or 25, as described for a non-failure type scenario. However since a new Clone 60 is being employed, a Delta Map 81 for that Clone and a Persistent Delta Map 82 which indicates the state at finish is also shown.

During this operation, Host-write 1 though interface 17a is received by the Source 20 over path 15a. This write request affects a data area on the Source LU that is represented by multiple (2) bits in the Clone's Delta Map (bits 6 and 7). Because bit 6 of Clone1's Delta Map 28 is not set, no COD is required. However, the Host write request still cannot be processed at this time until bit 7 is checked. Because bit 7 of Clone1's Delta Map 28 is set and the corresponding bit is not set in the Protected Restore Map 32, a COD is required. The COD Engine copies extent 7 from the Clone 22 to the Source 20.

Figure 8:
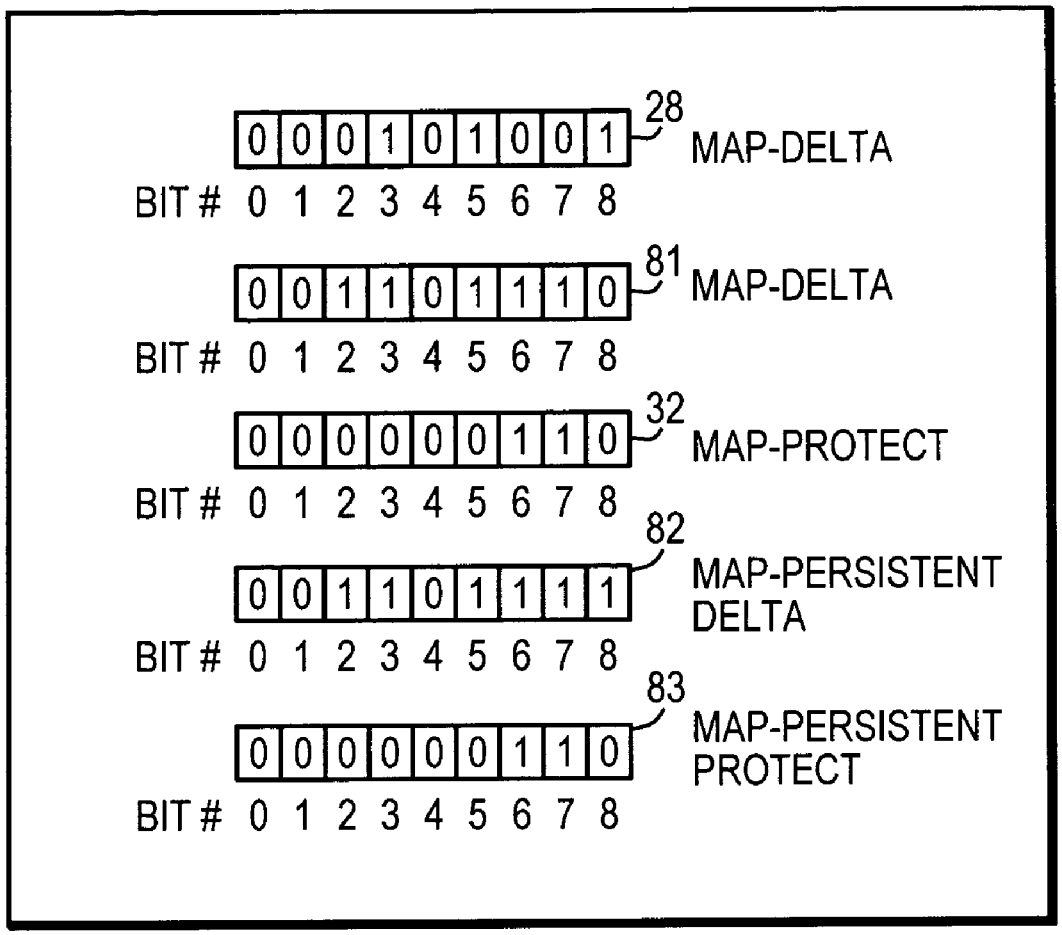
FIG. 8 shows an example of what may be experienced during carrying out the methodology of this invention.

Referring to FIG. 8, once the COD has been completed, Host-write 1 can be processed. Before doing so, bits must be updated in the Protected Restore Map as well as Clone 60's Delta Map 81. The bits (6 & 7) in the Protected Restore Map 32 that correspond to those extents on the Source LU affected by the Host-write 1 must be set to identify the data areas to protect from data copies performed by the Sync Engine that might otherwise corrupt data by overwriting. The bits (6 & 7) in Delta Map 81 are set to track those extents with data that is different between Clone 60 and the Source 20. The data from the Delta Maps 28 & 81 are written to persistent storage and the write request is processed. The Persistent Delta Map 82 now contains a bit set for those extents with data that is different between the Source 20 and each of its Clones 22 & 60.

Figure 9:
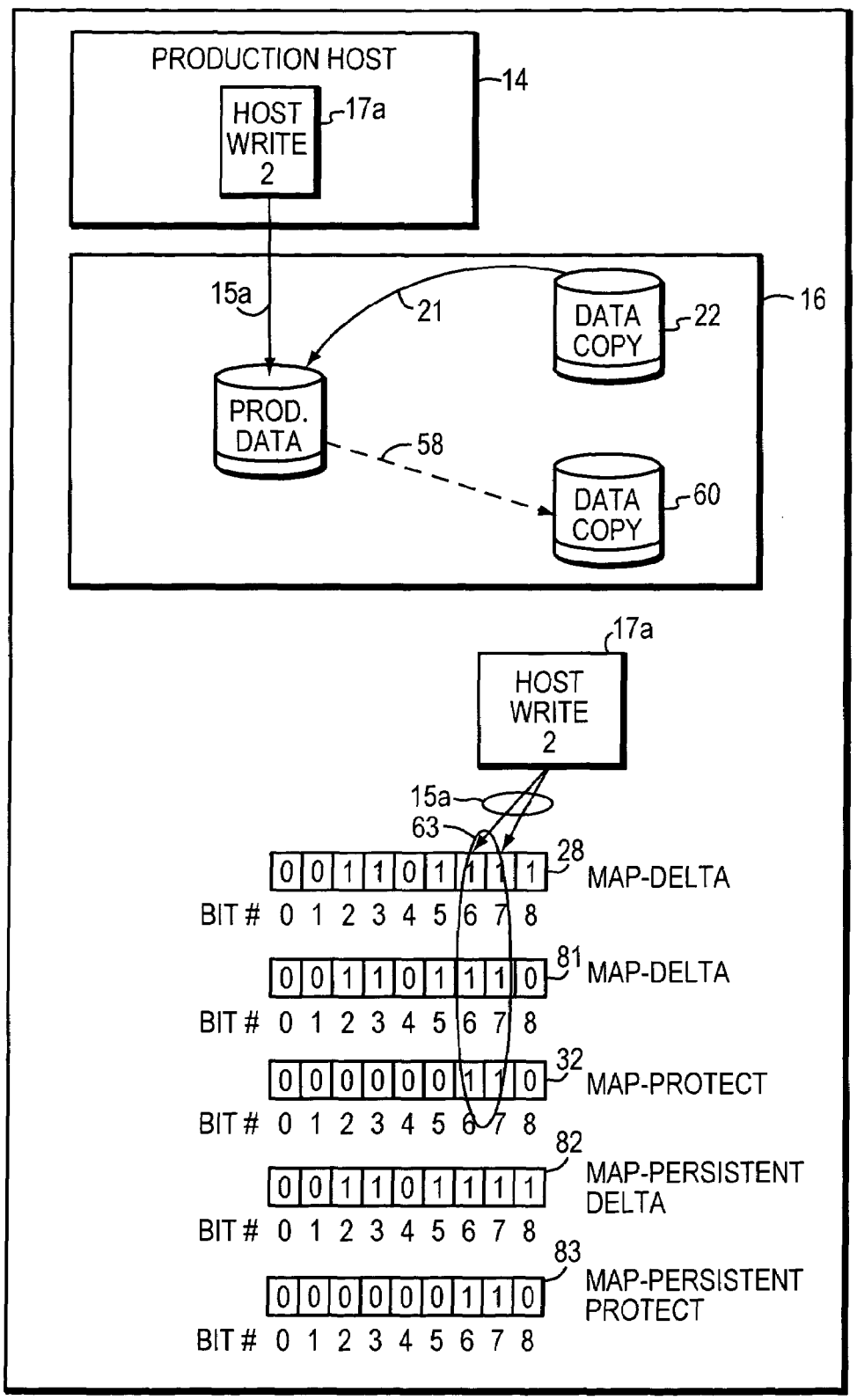
FIG. 9 shows another exemplary embodiment including the data storage system and program logic of FIG. 1 and illustrates an example of states that may be experienced during carrying out the methodology of this invention.

Referring now to FIG. 9, prior to a Protected Restore being resumed during the Recovery Process, the Protected Restore Map 32 is filled using a Persistent Protected Restore Map 83 kept in persistent storage (e.g., on disk). Both Clone 22's and Clone 60's Delta Maps are filled using the Persistent Delta Map 82. Because there is a single Persistent Delta Map used to represent multiple Clones, it is possible that the Restore Process will cause a bit to be set in Clone 22's Delta Map that had previously been cleared either by the Sync Engine or the COD Engine In the exemplary embodiment of FIG. 9, it can be seen in area 63 that bits 6 and 7 in Clone 22's Delta Map 28 have been set during the Recovery Process because those bits had been set in Clone 60's Delta Map 81 and therefore were set in the Persistent Delta Map 82. These bits were not set prior to the failure which lead to the recovery.

So, when the Protected Restore is resumed, the Sync Engine begins copying the required extents (using the Delta Map 28) from Clone 22 to the Source 20. If the Sync Engine copied the extents represented by bits 6 and 7, then effect of the Host-write request would get overwritten, which would be undesirable data corruption. But reference to the Protected Restore Map 32 confirms that the corresponding bits are set in the Protected Restore Map, so the corresponding data areas should be protected on the Source. Accordingly, the Program Logic will control the Sync Engine and the COD Engine so neither will cause copying of these data areas from the Clone to the Source.

Also, If Host Write 2 (shown at 17a of FIG. 9) is received after the Protected Restore has been resumed, a COD should not be performed even though the bits that represent the affected extents (bits 6 and 7) are set in the Clone's Delta Map 28. Doing so would also cause Host Write 1 to get overwritten, which would corrupt the data on the Source.

Synopsis of Description of Operation

To provide the "instant" appearance of Clone data on the Source (without data corruption), the Clone's Delta Map and the Protected Restore Map are used. When a read request is received by the Source during a Protected Restore, a check is made to determine if the bits are set in the Clone's Delta Map that correspond to extents affected by the read request. If the bit is set and the corresponding bit is not set in the Protected Restore Map, a COD is performed to copy that extent from the Clone to the Source. The bit is then set in Protected Restore Map and cleared from the Clone's Delta Map. Once all the required data has been copied from the Clone to the Source, the host read request can be processed.

As mentioned earlier, some host I/O requests require a COD before the request can be processed. Waiting for the Sync Engine to copy the required extent may take quite a while because of the serialized nature of the way it copies data. This could result in host I/O requests timing out.

When a host I/O request requires data to be copied from the Clone to the Source prior to it being processed, the request is placed on the COD Queue. A check is then performed to determine if there are any extents that need to be copied that are not already in progress by the Sync Engine or COD Engine. This is done by checking the COD Scoreboard. Prior to copying an extent from the Clone to the Source, the Sync Engine and COD Engine set a bit in the COD Scoreboard for the extent they are copying. This allows both engines to know which extents the other (and themselves) is copying.

If there are no required extents to be copied that are not already in progress, the I/O request remains in a COD Queue until the required extents (that are already in progressed) are copied. If there are extents that need to be copied that are not already in progress by either engine, a COD is performed and the corresponding bit is set in the COD Scoreboard.

After each extent is copied from the Clone to the Source (either by the Sync Engine or COD Engine), the corresponding bit is cleared from the respective Clone's Delta Map and from the COD Scoreboard. A check is then made to see if any I/O requests on the COD Queue can be processed. If there are no bits set in the Clone's Delta Map for those extents affected by the I/O request, the request can be processed. If there are bits set, more extents need to be copied before the request can be processed. A check is again made to see if any required extents are already in progress. If all required extents are already in progress, the request is left on the COD Queue. If an extent needs to be copied that is not already in progress (corresponding bit not set in the COD Scoreboard), a COD is performed for the extent. Processing of the COD Queue in this manner allows host I/O requests to be processed as soon as their required extents have been copied from the Clone to the Source.

Having described a preferred embodiment of the present invention, it may occur to skilled artisans to incorporate these concepts into other embodiments. Nevertheless, this invention should not be limited to the disclosed embodiment, but rather only by the spirit and scope of the following claims and their equivalents.

What is claimed is:

1. In a data storage environment having a first volume of data denominated as the source being stored on a data storage system, and a second volume of data denominated as the clone, which has a data content that is a copy of the data content of the source being stored on the data storage system, a method, operable on a computer system, for protecting the clone's data content during a restoration of the source, the method comprising the steps of:

restoring the source by copying data content from the clone to overwrite the data content of the source in a copy-on-demand process, while allowing host reads and writes to the source during the restoring step, said copying being determined by a clone delta map, used to track extents of the clone that are different between the clone and the source, and a protected restore map, used to track extents of the source that are modified during the restoring step, when an indication is set in the clone delta map and not set in the protected restore map;

preserving the data content of the clone by not allowing it to be overwritten by host writes during the restoring step;

recording information that indicates the source affected by a host write in the protected restore map; and setting the protected restore map as the delta clone map after the restoring step is completed.

2. The method of claim 1, wherein the source and the clone are each represented by respective first and second logical units.

3. The method of claim 1, wherein the clone delta map is used to copy only extents that are different between the clone and its source during the restoring step.

4. The method of claim 3, wherein the protected restore map is coordinated with the clone delta map for efficient processing of requests to write data to the source.

5. A system for protecting data content during restoration of data from a second volume of data to a first volume of data, the system comprising:

a data storage system having a first volume of data denominated as the source being stored on a data storage system, and a second volume of data denominated as the clone and which has data content that is a copy of the data content of the source being stored on the data storage system or on another data storage system;

computer-executable program logic, configured from a computer-readable storage medium, configured for causing a computer to execute the steps of:

restoring the source by copying data content from the clone to overwrite the data content of the source in a copy-on-demand process, while allowing host reads and writes to the source during the restoring step, said copying being determined by a clone delta map, used to track extents of the clone that are different between the clone and the source, and a protected restore map, used to track extents of the source that are modified during the restoring step, when an indication is set in the clone delta map and not set in the protected restore map; and preserving the data content of the clone by not allowing it to be overwritten by host writes during the restoring step;

recording information that indicates the source affected by a host write in the protected restore map; and setting the protected restore map as the delta clone map after the restoring step is completed.

6. The system of claim 5, wherein the source and the clone are each represented by respective first and second logical units.

7. The system of claim 5, wherein the clone delta map is used to copy only extents that are different between the clone and its source during the restoring step.

8. The system of claim 7, wherein the protected restore map is coordinated with the clone delta map for efficient processing of requests to write data to the source.

9. A program product for use in a data storage environment and being for protecting data content during restoration of data from a second volume of data to a first volume of data, wherein the data storage environment includes:

a data storage system having a first volume of data denominated as the source being stored on a data storage system, and a second volume of data denominated as the clone, which has data content that is a copy of the data content of the source being stored on the data storage system; and the program product includes computer-executable logic, provided from a computer-readable medium, which is configured to cause a computer to execute the steps of:

restoring the source by copying data content from the clone to overwrite the data content of the source in a copy-on-demand process, while allowing host reads and writes to the Source during the restoring step, said copying being determined by a clone delta map, used to track extents of the clone that are different between the clone and the source, and a protected restore map, used to track extents of the source that are modified during the restoring step, when an indication is set in the clone delta map and not set in the protected restore map;

preserving the data content of the clone by not allowing it to be overwritten by host writes during the restoring step;

recording information that indicates the source affected by a host write in the protected restoring map; and setting the protected restore map as the delta clone map after the restoring step is completed.

10. The program product of claim 9, wherein the source and the clone are each represented by respective first and second logical units.

11. The program product of claim 9, wherein the clone delta map is used to copy only extents that are different between the clone and its source during the restoring step.

12. The program product of claim 11, wherein the protected restore map is coordinated with the clone delta map for efficient processing of requests to write data to the source.

* * * * *